US011577320B2

(12) United States Patent
Morrow et al.

(10) Patent No.: US 11,577,320 B2
(45) Date of Patent: Feb. 14, 2023

(54) SHUTTER ASSEMBLY FOR X-RAY DETECTION (71) Applicant: THERMO ELECTRON SCIENTIFIC INSTRUMENTS LLC, Madison, CA (US)

(72) Inventors: Justin Morrow, Madison, WI (US); Steven J. Foote, Middleton, WI (US)

(73) Assignee: THERMO ELECTRON SCIENTIFIC INSTRUMENTS LLC, Madison, WI (US)

( * ) Notice: Subject to any disclaimer, the term of this patent is extended or adjusted under 35 U.S.C. 154(b) by 58 days.

(21) Appl. No.: 17/303,895

(22) Filed: Jun. 9, 2021

(65) Prior Publication Data
US 2022/0011252 A1 Jan. 13, 2022

Related U.S. Application Data (60) Provisional application No. 62/705,177, filed on Jun. 15, 2020.

(51) Int. Cl.
*B22F 10/28* (2021.01)
*G01N 23/2252* (2018.01)
*B22F 10/30* (2021.01)

(52) U.S. Cl.
CPC ........ *B22F 10/28* (2021.01); *G01N 23/2252* (2013.01); *B22F 10/30* (2021.01); *G01N 2223/102* (2013.01); *G01N 2223/313* (2013.01); *G01N 2223/317* (2013.01)

(58) Field of Classification Search
None
See application file for complete search history.

(56) References Cited

U.S. PATENT DOCUMENTS

| 4,172,225 A | 10/1979 | Woldseth et al. | |
|---|---|---|---|
| 8,368,019 B2 * | 2/2013 | Mantz | H01J 37/256 250/397 |
| 8,368,020 B2 * | 2/2013 | Mantz | H01J 37/28 250/397 |
| 8,450,215 B2 * | 5/2013 | Mantz | H01J 37/28 438/712 |
| 8,809,780 B2 | 8/2014 | Wollenhaupt | |
| 9,550,207 B2 | 1/2017 | Ackelid | |
| 9,878,371 B2 | 1/2018 | Varetti | |

(Continued)

FOREIGN PATENT DOCUMENTS

EP 2458434 A1 5/2012
IN 04584CH2014 A 12/2014
(Continued)

OTHER PUBLICATIONS

PCT Search Report and Written Opinion dated Sep. 27, 2021, for PCT Application No. PCT/IB21/55083.

*Primary Examiner* — Thomas R Artman (57) ABSTRACT

An embodiment of a shutter assembly is described that comprises a support structure with a number of stations and operatively coupled to a motor configured to translate each of the stations to a position in front of a detector, wherein a first station comprises a first aperture, a first charged particle filter, and a first window; and a second station comprises a second aperture larger than the first aperture, a second charged particle filter, and a second window thinner than the first window.

26 Claims, 5 Drawing Sheets

(56) References Cited

U.S. PATENT DOCUMENTS

| | | |
|---|---|---|
| 10,074,510 B2 | 9/2018 | Suematsu |
| 2011/0031215 A1* | 2/2011 | Mantz ............... H01J 37/244 |
| | | 378/53 |
| 2012/0025077 A1* | 2/2012 | Mantz ................ H01J 37/28 |
| | | 250/310 |
| 2012/0025078 A1* | 2/2012 | Mantz ............... H01J 37/256 |
| | | 250/370.01 |
| 2012/0326030 A1 | 12/2012 | Benner et al. |
| 2014/0061167 A1* | 3/2014 | Stecker ............. H01J 37/305 |
| | | 219/76.1 |
| 2017/0113415 A1 | 4/2017 | Desimone et al. |
| 2017/0136541 A1 | 5/2017 | Fager |
| 2018/0111193 A1 | 4/2018 | Romano |
| 2018/0354194 A1 | 12/2018 | Huang |
| 2019/0009470 A1 | 1/2019 | Gianni et al. |
| 2019/0061253 A1 | 2/2019 | Zeulner et al. |
| 2019/0210291 A1 | 7/2019 | Reichenbacher et al. |
| 2021/0310348 A1 | 10/2021 | Morrow et al. |
| 2022/0011252 A1* | 1/2022 | Morrow ............ G01N 23/2252 |

FOREIGN PATENT DOCUMENTS

| | | |
|---|---|---|
| WO | 2014202608 A1 | 12/2014 |
| WO | 2018217646 A1 | 11/2018 |
| WO | 2019074827 A1 | 4/2019 |

\* cited by examiner

SHUTTER ASSEMBLY FOR X-RAY DETECTION

CROSS-REFERENCE TO RELATED APPLICATIONS

This application claims the priority benefit of U.S. provisional patent application Ser. No. 62/705,177 filed Jun. 15, 2020, the entire disclosure of which is incorporated herein by reference.

FIELD OF THE INVENTION

The present invention is generally directed to a shutter system with different configurations, each configuration designed for a different mode of operation.

BACKGROUND

It is generally appreciated that embodiments of Energy Dispersive X-ray Spectroscopy (EDS) systems are configured to detect X-ray photons emitted from a material exposed to an electron beam, where the detected X-ray photons are generally used to characterize the elemental composition of the material. It is also generally appreciated that depending on the application the electron beam can produce back scattered electrons (e.g. charged particles), heat, metal vapor, etc. that can create noise in detected signals and cause damage to components of the EDS, such as the detector elements.

Embodiments of (EDS) instruments can be used in applications such as, for example, with a Scanning Electron Microscope (SEM) or Transmission Electron Microscope (TEM), where a "shutter assembly" may be employed to reduce or eliminate noise signals produced by the EDS instrument, as well as to protect components such as detector elements from potentially damaging conditions such as heat, metal vapor, etc. For example, a SEM or TEM generally has a single, standard mode of operation, and the shutter system employed is typically configured to optimize the parameters used for that mode of operation. Thus, there is no need for the shutter system to be configurable for different conditions. In the presently described example, parameters for the shutter system such as the window material and/or thickness, aperture size, etc., are fixed in the SEM or TEM instrument.

Embodiments of EDS instrument may also be used with Electron-Beam Additive Manufacturing (EBAM) instruments. An EBAM instrument may utilize one or more manufacturing applications to produce a product, such as what is referred to as electron beam melting or electron-beam powder bed fusion technology. An example of an EDS instrument used with and EBAM instrument in described in US Provisional Patent Application Ser. No. 63/003,575, filed Apr. 1, 2020, titled "Wide field-of-view charged particle filter", which is hereby incorporated by reference herein in its entirety, for all purposes.

An EBAM instrument utilizing and EDS system may be capable of various modes of operation that includes one or more modes of operation substantially as a SEM where the electron beam operates using a moderate level of total power, maximum beam current, and accelerating voltage (e.g. about 10-30 keV) producing a moderate degree of heat, light, and X-ray emissions. The modes of operation also typically include one or more of the manufacturing modes referenced above where the electron beam operates using a high level of total power, maximum beam current, and accelerating voltage (e.g. about 60-100 keV) capable of producing substantial degrees of heat, light, metal vapor, and X-ray emissions that can be potentially damaging to one or more components of the EDS system, such as the detector. For example, a typical SEM max may use about 2 µA at 30 keV to produce about 60 mW of total power, where an EBAM manufacturing mode may use about 50 mA at 60 keV to produce about 3 kW of total power. It will also be appreciated that operational parameters of EBAM systems may vary and that systems may be capable of a range of accelerating voltages from very low to very high.

Therefore, a need exists for a shutter assembly with different stations, each configured to balance protection of the EDS components with accurate detection of X-ray photons for a different mode of operation.

SUMMARY

Systems, methods, and products to address these and other needs are described herein with respect to illustrative, non-limiting, implementations. Various alternatives, modifications and equivalents are possible.

An embodiment of a shutter assembly is described that comprises a support structure with a number of stations and operatively coupled to a motor configured to translate each of the stations to a position in front of a detector, wherein a first station comprises a first aperture, a first charged particle filter, and a first window; and a second station comprises a second aperture larger than the first aperture, a second charged particle filter, and a second window thinner than the first window.

In some cases, the support structure has six stations. The support structure may also have two embodiments of the first station and/or two embodiments of the second station. The second window can be constructed with a different material from the first window that may include Beryllium. The second window may include a polymer material such as, for instance $Si_3N_4$.

Further, the support structure may be substantially circular in one plane, wherein the stations are circumferentially arranged on the plane. The motor may be a vacuum safe stepper motor that can be operatively coupled at a central hub of the support structure. Last, the shutter assembly may include a third station with a solid structure.

An embodiment of an energy dispersive X-ray spectroscopy instrument is also described that comprises a detector configured to produce a signal in response to one or more X-ray photons released from a product in response to an electron beam; and a shutter assembly that comprises a support structure with a number of stations and operatively coupled to a motor configured to translate each of the stations to a position in front of a detector, wherein a first station comprises a first aperture, a first charged particle filter, and a first window; and a second station comprises a second aperture larger than the first aperture, a second charged particle filter, and a second window thinner than the first window.

In some implementations, the support structure has two embodiments of the first station and two embodiments of the second station. The second window can be constructed with a different material from the first window that may include Beryllium. The second window may include a polymer material such as, for instance $Si_3N_4$.

Further, the support structure may be substantially circular in one plane, wherein the stations are circumferentially arranged on the plane. The motor may be a vacuum safe stepper motor.

Additionally, an embodiment of an electron-beam additive manufacturing instrument is described that comprises an electron beam source configured to produce an electron beam; a platform configured as a support upon which the electron beam additive manufacturing instrument builds a product in response to the electron beam; and an energy dispersive X-ray spectroscopy instrument that comprises a detector configured to produce a signal in response to one or more X-ray photons released from the product in response to the electron beam; and a shutter assembly configured to protect the detector from emissions released from the product in response to the electron beam and that comprises a support structure with a number of stations and operatively coupled to a motor configured to translate each of the stations to a position in front of a detector, wherein a first station comprises a first aperture, a first charged particle filter, and a first window; and a second station comprises a second aperture larger than the first aperture, a second charged particle filter, and a second window thinner than the first window.

In some implementations, the support structure has two embodiments of the first station and two embodiments of the second station. The second window can be constructed with a different material from the first window that may include Beryllium. The second window may include a polymer material such as, for instance $Si_3N_4$.

Further, the support structure may be substantially circular in one plane, wherein the stations are circumferentially arranged on the plane. The motor may be a vacuum safe stepper motor.

The above embodiments and implementations are not necessarily inclusive or exclusive of each other and may be combined in any manner that is non-conflicting and otherwise possible, whether they are presented in association with a same, or a different, embodiment or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary Thus, the above embodiment and implementations are illustrative rather than limiting.

BRIEF DESCRIPTION OF THE DRAWINGS

The above and further features will be more clearly appreciated from the following detailed description when taken in conjunction with the accompanying drawings. In the drawings, like reference numerals indicate like structures, elements, or method steps and the leftmost digit of a reference numeral indicates the number of the figure in which the references element first appears (for example, element 110 appears first in FIG. 1). All of these conventions, however, are intended to be typical or illustrative, rather than limiting.

Like reference numerals refer to corresponding parts throughout the several views of the drawings.

DETAILED DESCRIPTION OF EMBODIMENTS

As will be described in greater detail below, embodiments of the described invention include a shutter assembly with different stations, each configured for a different mode of operation. More specifically, the shutter assembly is configured with a plurality of stations each comprising elements that optimize signal detection of the degree of X-ray emissions and protection from conditions such as heat, light, and/or excess X-ray emissions associated with a mode of operation.

Figure 1:
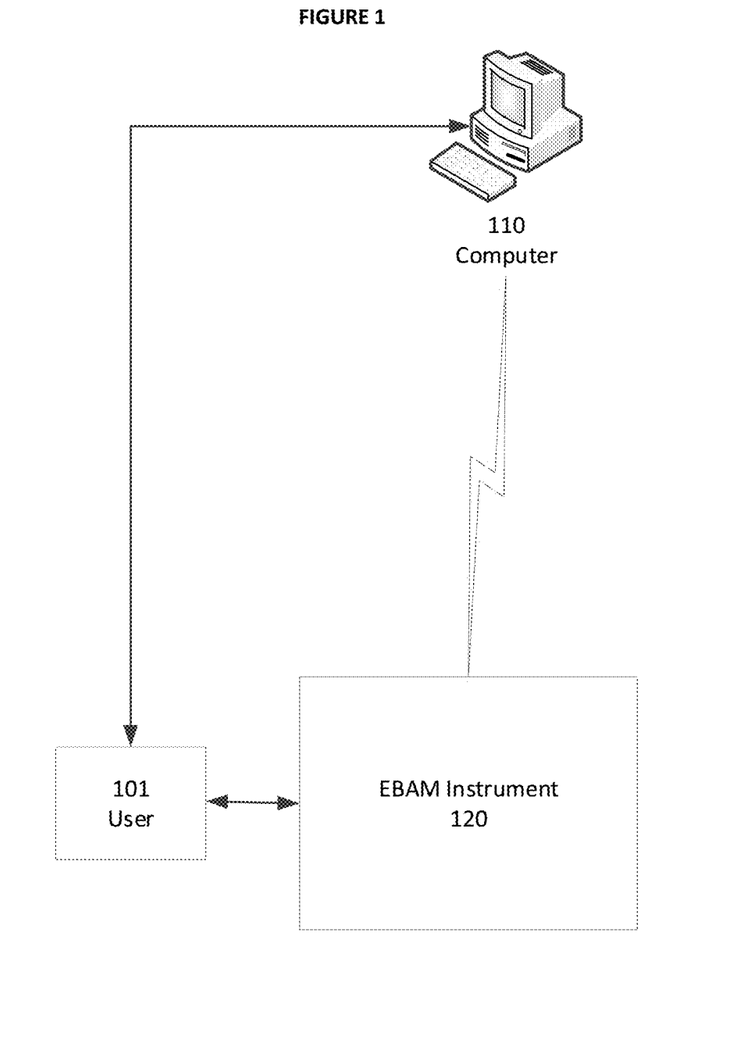
FIG. 1 is a functional block diagram of one embodiment of an electron-beam additive manufacturing instrument in communication with a computer.

FIG. 1 provides a simplified illustrative example of user 101 capable of interacting with computer 110 and EBAM Instrument 120. Embodiments of EBAM Instrument 120 may include a variety of commercially available EBAM Instruments. For example, EBAM Instrument 120 may include the Q10 electron beam melting instrument available from Arcam AB (a GE Additive company). FIG. 1 also illustrates a network connection between computer 110 and EBAM Instrument 120, however it will be appreciated that FIG. 1 is intended to be exemplary and additional or fewer network connections may be included. Further, the network connection between the elements may include "direct" wired or wireless data transmission (e.g. as represented by the lightning bolt) as well as "indirect" communication via other devices (e.g. switches, routers, controllers, computers, etc.) and therefore the example of FIG. 1 should not be considered as limiting.

Computer 110 may include any type of computing platform such as a workstation, a personal computer, a tablet, a "smart phone", one or more servers, compute cluster (local or remote), or any other present or future computer or cluster of computers. Computers typically include known components such as one or more processors, an operating system, system memory, memory storage devices, input-output controllers, input-output devices, and display devices. It will also be appreciated that more than one implementation of computer 110 may be used to carry out various operations in different embodiments, and thus the representation of computer 110 in FIG. 1 should not be considered as limiting.

In some embodiments, computer 110 may employ a computer program product comprising a computer usable medium having control logic (e.g. computer software program, including program code) stored therein. The control logic, when executed by a processor, causes the processor to perform some or all of the functions described herein. In other embodiments, some functions are implemented primarily in hardware using, for example, a hardware state machine. Implementation of the hardware state machine so as to perform the functions described herein will be apparent to those skilled in the relevant arts. Also in the same or other embodiments, computer 110 may employ an internet client that may include specialized software applications enabled to access remote information via a network. A network may include one or more of the many types of networks well known to those of ordinary skill in the art. For example, a network may include a local or wide area network that may employ what is commonly referred to as a TCP/IP protocol suite to communicate. A network may include a worldwide system of interconnected computer networks that is commonly referred to as the internet, or could also include various intranet architectures. Those of ordinary skill in the related art will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

As described herein, embodiments of the described invention include a shutter assembly configured with a plurality of stations each comprising a combination of elements designed to balance signal detection with promoting longevity of components such as detector elements.

Figure 2:
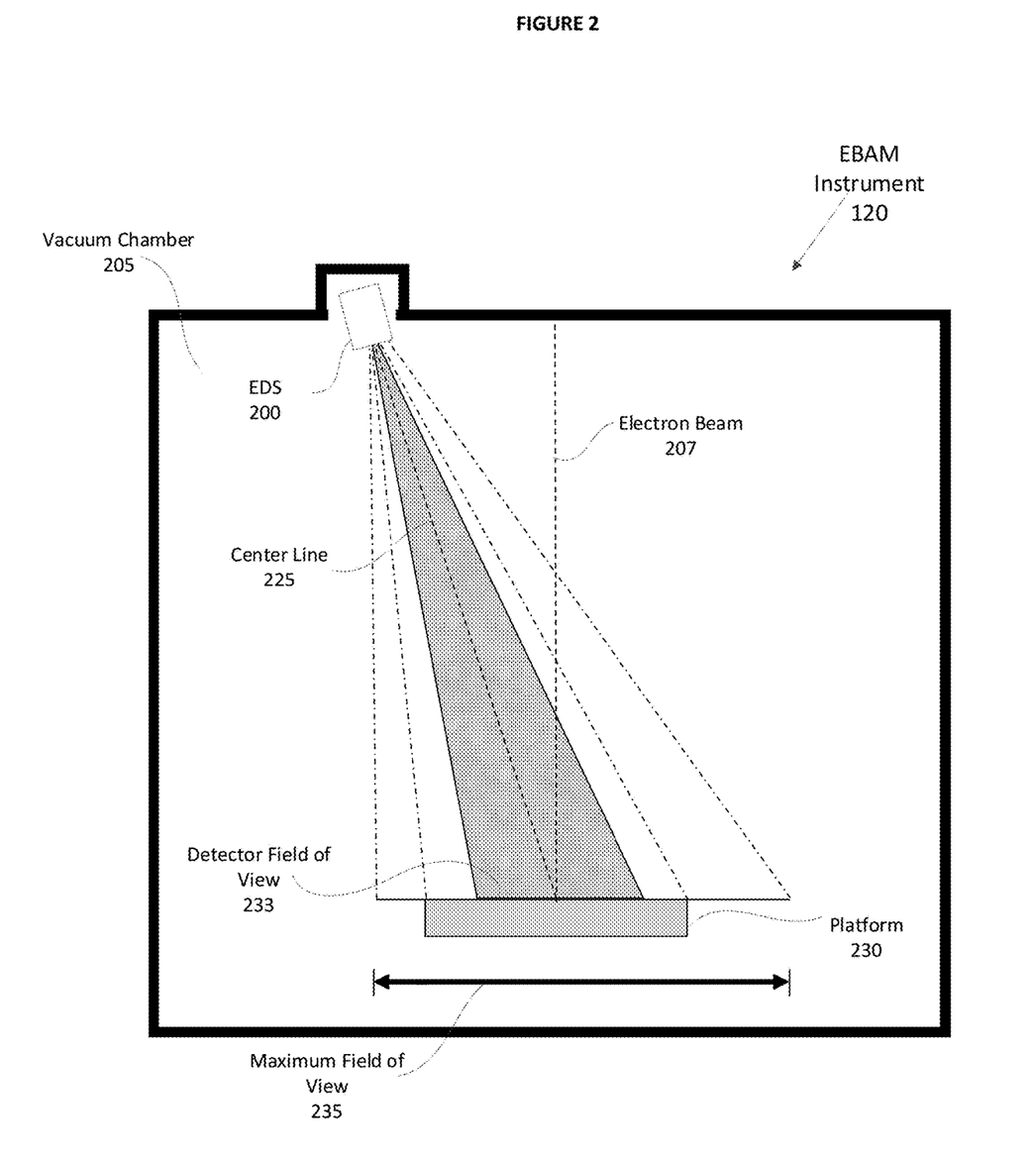
FIG. 2 is a simplified graphical representation of one embodiment of the electron-beam additive manufacturing instrument of FIG. 1 with an EDS system.

FIG. 2 provides a simplified illustrative example of EBAM instrument 120 that comprises EDS 200 positioned within vacuum chamber 205 that comprises a vacuum environment (e.g. negative pressure when compared to the ambient environment outside of EBAM 120) typically employed with electron-beam additive manufacturing applications. In typical implementations of EBAM Instrument 120, electron beam 207 originates from above platform 230 (e.g. electron beam 207 may be substantially perpendicular to the plane of platform 230, however it will be appreciated that electron beam 207 is under directional control of computer 110 to build products and may be directed at angles past perpendicular). Further, EDS 200 is positioned to one side of vacuum chamber 205 with a direct line of sight to platform 230. In the described embodiments, EDS 200 may be tilted at an angle relative to platform 230, where the degree of angle of tilt depends on the distance from the position of origination of electron beam 207, to provide detector field of view 233 to the region of platform 230 where electron beam 207 is used to build products. In many embodiments, the position of EDS 200 is limited to the available ports on vacuum chamber 205.

FIG. 2 also illustrates center line 225 that defines a plane from a center of a field of view of EDS 200 to the center of a field of view on a platform 230. In some embodiments center line 225 defines a distance between EDS 200 to platform 230 that is also related to the height distance of electron beam 207 that is defined by a distance between the top of platform 230 (e.g. the support upon which EBAM 120 builds products) to the top of vacuum chamber 205. For example, center line 225 may include a distance of about 472 mm and electron beam 207 may include a height distance of about 450 mm. However, it will be appreciated that EBAM 120 may include a variety of configurations and dimensions, and thus the dimensions in the present example should not be considered as limiting.

Additionally, FIG. 2 illustrates that detector field of view 233 is smaller than maximum field of view 235. In the embodiments described herein, it may be desirable that detector field of view 233 is not at the limit of maximum field of view 235. Alternatively, in some applications it may be desirable that detector field of view 233 is substantially the same as maximum field of view 235. For example, in some embodiments detector field of view 233 may include an area that is about 128 mm in diameter and maximum field of view 235 may include an area that is about 316 mm in diameter. Also in some cases platform 230 may include an area that is about 200 mm in diameter, or in width where embodiments of platform 230 are substantially square or rectangular.

Figure 3:
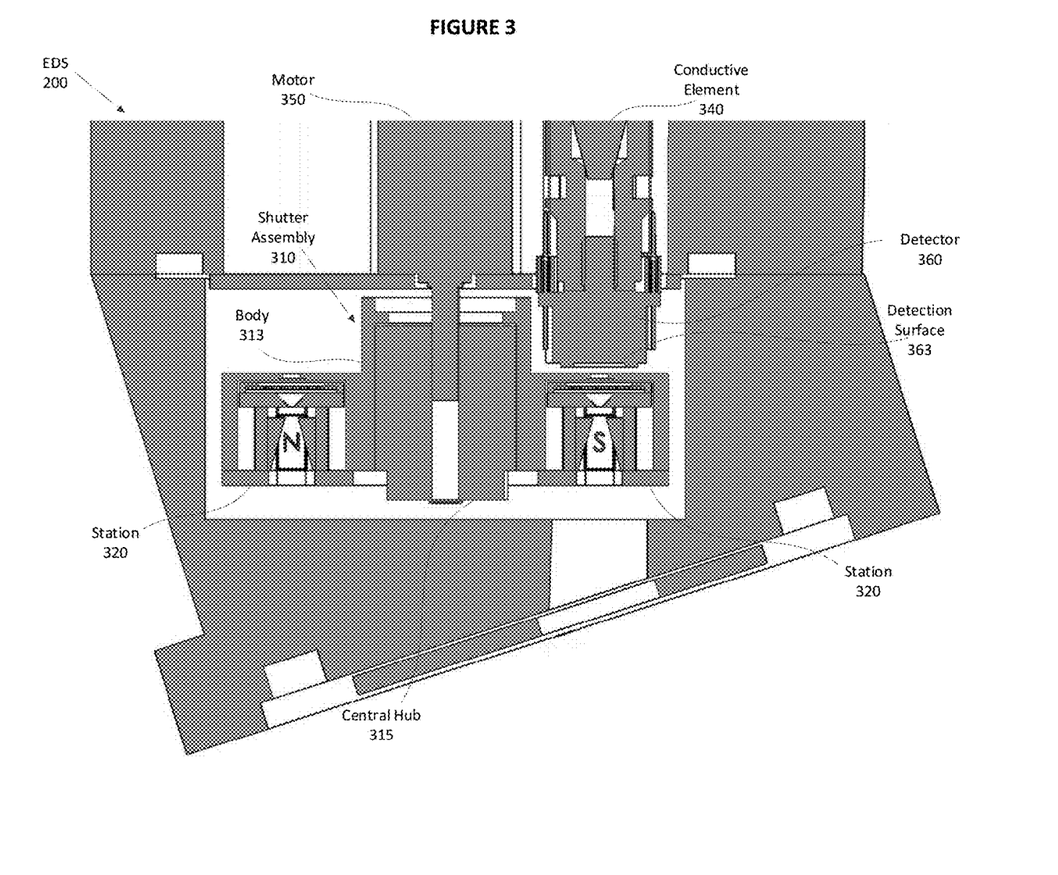
FIG. 3 is a simplified graphical representation of one embodiment of the EDS system of FIG. 2 with shutter assembly having a plurality of stations.

FIG. 3 provides a simplified illustrative example of a cut away view of EDS 200 that comprises shutter assembly 310 and detector 360. In some embodiments detector 360 may include detection surface 363 such as may be typically found with a Silicon Drift Detector (SDD), or other type of detector known in the related art. Importantly, shutter assembly 310 is very compact to minimize the amount of space required in EDS 200. FIG. 3 also illustrates components of EDS 200 that include detector 360 aligned with conductive element 340 configured to transfer heat away from detector 360 (e.g. may be referred to as a "heat pipe").

In some embodiments, shutter assembly 310 and detector 360 may be positioned in different environments separated by a partition that is gas tight and transmissive to x-ray photons (e.g. a "window"). For example, shutter assembly 310 may be positioned in an environment that is substantially the same as vacuum chamber 205 and detector 360 may be positioned within an environment that is substantially similar to the ambient environment outside of EBAM instrument 120. Further, it is desirable that the partition is thin, thus allowing low energy X-ray photons to pass, although in some cases may be supported by an additional structure to provide rigidity. The partition may be incorporated into a "cap" element (e.g. constructed to fit over detector 360) and the partition may be constructed of polymer based materials, Beryllium (Be), or Sodium (Na). However, any type of partition with desirable characteristics may be used.

FIG. 3 also illustrates motor 350 optatively coupled to shutter assembly 310 to provide the necessary force to move embodiments of station 320 into place, in line with detector 360 so that x-ray emissions can travel through station 320 to detector 360. For example, motor 350 may include a vacuum safe stepper motor coupled to central hub 315 (e.g. via a set screw or other configuration for mechanically coupling parts know to those of ordinary skill in the art). Central hub 315 may be constructed from metal, plastic, or other type of material compatible with x-ray detection. Desirable materials should not significantly outgas or be likely to build-up and discharge a static charge that could damage detector 360. In the presently described example, shutter assembly 310 is substantially circular and motor 350 provides a rotational force to body 313, under control of computer 110, to rotate body 313 about an axis that is perpendicular to the plane where stations 320 are positioned.

It will also be appreciated that in some embodiments, shutter assembly 310 may include a substantially rectangular shape with embodiments of station 320 arranged in a linear fashion such that motor 350 provides a linear force to extend and retract shutter assembly 310, to position stations 320 in line with detector 360.

As illustrated in FIG. 3, shutter assembly 310 includes body 313 constructed from similar materials to those described for central hub 315, however it will be appreciated the central hub 315 and body 313 could be constructed using different materials from each other. Body 313 is also constructed to hold and properly position embodiments of station 320 so that they are aligned with the desired field of view to platform 230 (e.g. and a target sample disposed thereon) as well as with detector 360.

Figure 4A:
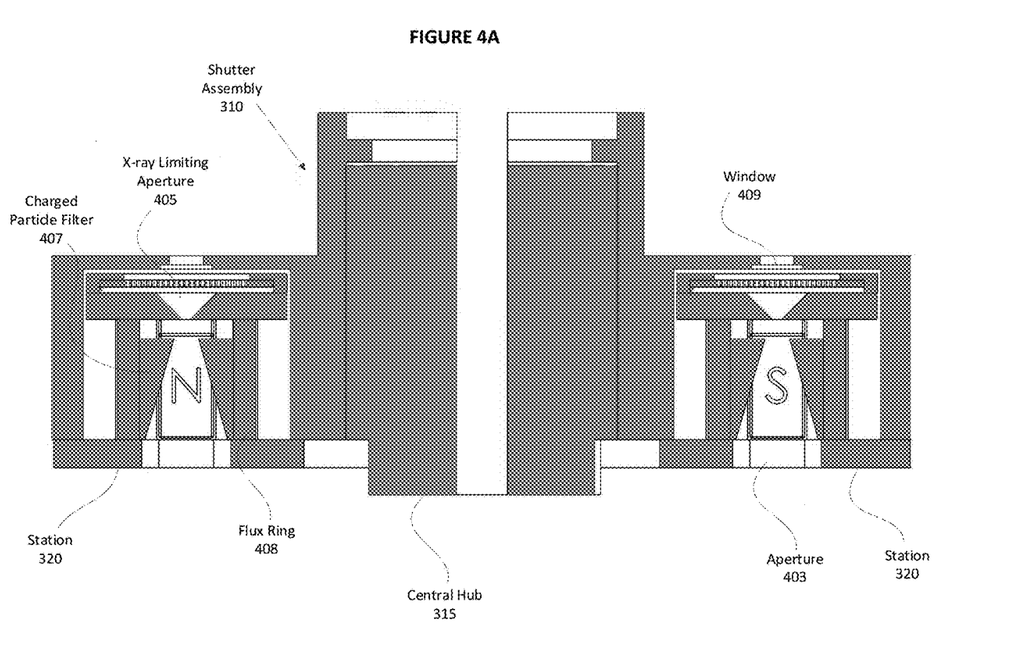
FIG. 4A is a simplified graphical representation of one embodiment of the shutter assembly and stations of FIG. 3.

FIG. 4A provides a magnified view of shutter assembly 310 and illustrates examples of several important components of station 320. Again, shutter assembly 310 is very compact, having a height in a range that is about 10-15 mm and a width (e.g. diameter for a circular embodiment) in a range of about 40 mm-60 mm. The components include X-ray limiting aperture 405 that selectively limits the number of X-ray photons that strike detector 360. In some embodiments, X-ray limiting aperture 405 defines the range of X-ray photons for detector field of view 233 that is associated with the area interacting with electron beam 207, thus reducing the detection of X-ray photons originating from other parts of vacuum chamber 205 that could contribute to noise in the signal. In some embodiments, X-ray limiting aperture 405 may also reduce the number of photons that strike detector 360, which has the benefit of reducing the likelihood of saturation or damaging elements of detector 360.

FIG. 4A further illustrates charged particle filter 407 that includes a plurality of magnets, each with a surface sloped at an angle that define a bore through which X-ray photons pass. In the described embodiments, the angle and position of the magnets, at least in part, defines the area of detector field of view 233, and the slope of the magnets produces a magnetic field that comprises a gradient that is strongest on a side of the bore that is proximate to detector 220 and weakest at aperture 403 on a side of the bore facing platform 230 (e.g. where the X-ray photons and charged particles originate). Those of ordinary skill in the art will appreciate that the magnetic field strength is proportional to the strength of the magnets and the distance between them. Also, the magnetic field must include sufficient field strength to efficiently deflect charged particles, however the field strength should not be so strong such that it influences electron beam 207 or significantly affects the operation of detector 360 as the charged particles migrating inside detector 360 could be influenced by the magnetic field if the field strength is excessively high. For example, the magnetic field may include a gradient of magnetic field strength in the range of about 1000 gauss-5000 gauss. However, it will be appreciated that the field strength depends on a variety of factors such as the grade of material used for the magnets, and thus the example should not be considered as limiting.

In many embodiments of EDS 200, it is very important to ensure a large detector field of view 233. As described, detector field of view 233 are, at least in part, defined by characteristics of shutter assembly 210. For example, the angle and position of the magnets define, in part, detector field of view 233. However, it will also be appreciated that the positional relationship and configuration of other elements, including elements within station 320, also have an effect on the dimension of detector field of view 233. In the presently described example, the positional relationship between charged particle filter 407 (e.g. in particular an aperture defined by the spacing between the magnets) and X-ray limiting aperture 405 has an effect. As the distance between charged particle filter 407 and X-ray limiting aperture 405 increases, the degree of detector field of view 233 shrinks. Further, as the dimension of X-ray limiting aperture 405 (e.g. the opening) decreases, the degree of detector field of view 233 also decreases. Also, the positional relationship between detector 360 and X-ray limiting aperture 405 has an effect, where past a certain distance the X-ray photons are no longer completely focused on to the active area of detector 360 (e.g. the fringe areas are focused off the active area and thus are not detected). In the present example, a desirable configuration for a compact geometry of stations 320 includes a distance between charged particle filter 407 and X-ray limiting aperture 405 in the range of about 1 mm-2 mm, and a distance between detector 360 and X-ray limiting aperture 405 in the range of about 2 mm-5 mm.

FIG. 4A also illustrates flux ring 408 that comprises a geometry that properly positions the magnets for the desired slope angle. In some embodiments the flux ring may be constructed of steel, or other desirable material. For example, the flux ring may be constructed from any suitable ferromagnetic permeable material which may vary depending on space availability, location to other sensitive items effected by the magnetic field, or other factors. In the present example, specific materials may include sintered cobalt, or one of various types of specialty grade of steel.

Further, FIG. 4A illustrates window 409 that may vary in thickness depending on the degree of permissibility for X-ray photons to pass is desirable for a particular mode of operation (e.g. depending on the embodiment described in further detail below). Also, the type of material used for construction of window 409 depends on the mode of operation and includes polymer based materials, Beryllium (Be), or Sodium (Na).

In some embodiments, stations 320 are easily removable from body 313 to allow for replacement. Further, each of stations 320 may be configured to enable easy replacement of one or more components. For example, it may be desirable to replace one or more embodiments of station 320 with another embodiment that has different component characteristics which provide different performance characteristics desirable for another mode of operation. In the same or alternative example, one or more components of and/or embodiments of station 320 may become contaminated over time through use. Contamination may include vapor deposition of metals onto one or more of the surfaces of station 320, such as the surface of window 409, charged particle filter 407, or X-ray limiting aperture 405. The contamination can have a significant detrimental impact on the performance of station 320 to the point where it becomes desirable to replace with a clean component and/or embodiment.

Figure 4B:
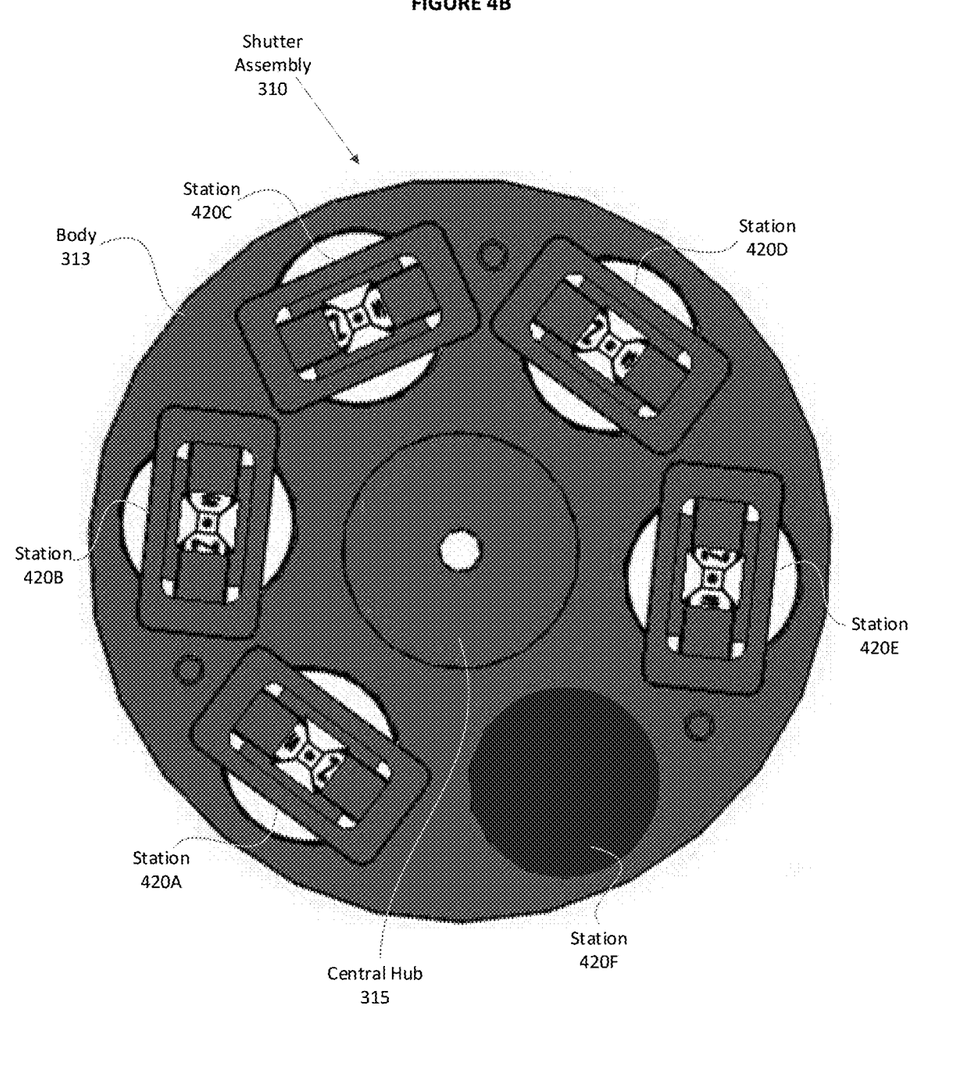
FIG. 4B is a simplified graphical representation of one embodiment of the shutter assembly and stations of FIG. 3.

FIG. 4B provides an additional example of a bottom view of shutter assembly 310 (e.g. view from platform 230 towards detector 360), that includes a plurality of embodiments of station 320 (e.g. illustrated in FIG. 4B as stations 420A-E) circumferentially positioned in body 313 with specific configurations for different modes of operation. Those of ordinary skill in the art will appreciate that the bottom surface of shutter assembly 310 may comprise a substantially planar surface.

In the described embodiments, one or more of stations 420A-E, such as stations 420A, 420C, and 420E, may be configured for one or more manufacturing modes of operation by EBAM 120 (e.g. it will be appreciated that stations 420A, 420C, and 420E may be configured for the same manufacturing mode or two or more different manufacturing modes). For example, it is generally desirable to have at least one station configured for each mode of operation in order to manage parameters that include x-ray throughput (e.g. modulated by the size of x-ray limiting aperture 405); protection for detector 360 and/or required chemical sensitivity (e.g. modulated by material and/or characteristics of window 409); and/or the degree of energy of the charged particles allowed to pass (e.g. modulated by charged particle filter 407) that may be especially important during high power operation.

Continuing the example from above, the manufacturing modes of operation by EBAM 120 may include analysis during layer pre-heating, during layer fusion, and low power scanning before or after these other steps while the environment is still warm. This third option may have a different requirement than a low-power scan used on cold powder. In the presently described example, the amount of current used for low power scanning may be lower power than the preheat step, but still high enough to enable material identification.

The maximum number of combinations used for a particular embodiment may be dictated by the space constraints. In some embodiments it is desirable that stations 420 include replicates of the above listed configurations so that the consumable parts can be changed less frequently. In the same or alternative embodiments stations 420 may include one or more configuration employed with less frequently used combinations or experiments. Further, in some embodiments the layout and/or number of stations 420 may be configured to optimize the amount if movement required by motor 350, for instance to minimize unnecessary delay due to movement to properly position the desired configuration of station 420.

In some embodiments, during the manufacturing mode of operation EDS 200 may be employed to identify and/or classify one or more unexpected chemical constituents (e.g. defects) that may be present in each layer as it is manufactured, as well as to quantify the alloy chemistry of a part under manufacture to assess if there is any time dependent drift in the chemistry. The embodiments of stations 420A-E configured for the manufacturing mode comprise a small dimension of X-ray limiting aperture 405 that is desirable when large currents for electron beam 207 are employed (e.g. about 30 µm for beam currents in a range from about 5 mA to tens of mA, for instance about 45 mA, used for melting metal powder materials). The small dimension of aperture 405 limits the number of X-ray photons that reach detector 360 that, while enough for detection of material, reduces the likelihood of damage to detector 360. In the manufacturing mode embodiments, window 409 may be constructed with Beryllium as one of the main chemical constituents that further acts to protect detector 360 from heat, light, and metal vapor while still being permissive to X-ray photons. In some cases, Polymer or nitride windows could be used, but would not provide the same protection. These windows could be used if coated with a reasonably thick reflective metallic coating (e.g. aluminum), but this would reduce x-ray sensitivity and the performance would become similar to Beryllium.

The example of FIG. 4B may also include one or more or stations of 420A-E, such as station 420B and 420D, configured for one or more SEM modes of operation by EBAM 120 (e.g. it will be appreciated that stations 420B, and 420D may be configured for the same SEM mode or two or more different manufacturing modes). For example, station 420 configured for a SEM mode of operation may typically include a larger aperture to accounts for the reduced x-ray production, window 409 comprising a light element construction that allows maximum sensitivity, potentially even no implementation of window 409 if it is anticipated that no direct damage will occur to detector 360 (no vapor is present, heat is negligible).

In some embodiments, during the SEM mode of operation EDS 200 may be employed to quantify the oxygen content of a metal powder and/or used to assess whether the powder has sufficient cleanliness for use. The embodiments of stations 420A-E configured for the SEM mode comprise a dimension of X-ray limiting aperture 405 that is slightly larger than the dimension of aperture 405 configured for the manufacturing mode(s) of operation, which is useful for use with a beam current that is lower than that used for the manufacturing mode of operation (e.g. about 500 µm for a beam current in a range of about 0.2 mA to about 0.5 mA used for heating but not melting metal powder). The slightly larger dimension of aperture 405 allows a greater number of X-ray photons to reach detector 360 that increases the ability of detector 360 to detect small signals. In some embodiments, the dimension of X-ray limiting aperture 405 for a second SEM mode of operation may be even larger than the slightly larger dimension of aperture 405 configured for the first SEM mode of operation (e.g. a range from about 500 µm to about 2 mm), which is useful for a small beam current that is lower than that used for the first SEM mode of operation (e.g. a beam current used to probe alloy chemistry without significant heating).

In the SEM mode embodiments, window 409 may thinner (e.g. a range from about 0.25 µm to about 1 µm) than that used for the manufacturing mode(s) and could be constructed with $Si_3N_4$ as one of the main chemical constituents that allows more energy X-ray photons to pass (e.g. from light elements), however any compatible material is deemed to be within the scope of the invention. Window 409 configured for the SEM mode(s) provides less protection to detector 220 from heat and light than the embodiment configured for the manufacturing mode(s).

The example of FIG. 4B further illustrates station 420F that in some embodiments may be substantially open (e.g. does not include charge particle filter 407 or X-ray limiting aperture 405) so that X-ray photons reach detector 360 substantially unimpeded. Alternatively, station 420F may include a substantially solid surface that effectively blocks all emissions from the sample which may be desirable for use in some manufacturing modes of operation. It will further be appreciated that the regions between stations 420A-F are constructed of the material of body 313 and may serve the same purpose as a completely blocked station such as station 420F. Further, in some embodiments there may be multiple instances of station 420F, in some cases an instance where station 420F is completely open and a second instance where station 420F is completely blocked.

Those of ordinary skill will appreciate that stations 420A-F may be arranged in any order as a configuration that supports the desired modes of operation of EBAM 120, and thus the examples provided should not be considered as limiting.

Having described various embodiments and implementations, it should be apparent to those skilled in the relevant art that the foregoing is illustrative only and not limiting, having been presented by way of example only. Many other schemes for distributing functions among the various functional elements of the illustrated embodiments are possible. The functions of any element may be carried out in various ways in alternative embodiments

What is claimed is:
1. A shutter assembly, comprising:
a support structure comprising a plurality of stations and operatively coupled to a motor configured to translate each of the stations to a position in front of a detector, wherein:
a first station comprises a first aperture, a first charged particle filter, and a first window; and
a second station comprises a second aperture larger than the first aperture, a second charged particle filter, and a second window thinner than the first window.
2. The shutter assembly of claim 1, wherein:
the support structure comprises six stations.
3. The shutter assembly of claim 1, wherein:
the support structure comprises two embodiments of the first station.
4. The shutter assembly of claim 3, wherein:
the support structure comprises two embodiments of the second station.

5. The shutter assembly of claim 1, wherein:
the second window constructed with a different material from the first window.

6. The shutter assembly of claim 5, wherein:
the first window is configured with a material that comprises beryllium.

7. The shutter assembly of claim 5, wherein:
the second window is configured with a polymer material.

8. The shutter assembly of claim 7, wherein:
the polymer material comprises $Si_3N_4$.

9. The shutter assembly of claim 1, wherein:
the support structure is substantially circular in one plane, wherein the stations are circumferentially arranged on the plane.

10. The shutter assembly of claim 1, wherein:
the motor comprises a vacuum safe stepper motor.

11. The shutter assembly of claim 1, wherein:
the motor is operatively coupled at a central hub of the support structure.

12. The shutter assembly of claim 1, further comprising:
a third station comprising a solid structure.

13. An energy dispersive X-ray spectroscopy instrument, comprising:
a detector configured to produce a signal in response to one or more X-ray photons released from a product in response to an electron beam; and
a shutter assembly configured to protect the detector from emissions released from the product in response to the electron beam, wherein the shutter assembly comprises:
a support structure comprising a plurality of stations and operatively coupled to a motor configured to translate each of the stations to a position in front of the detector, wherein:
a first station comprises a first aperture, a first charged particle filter, and a first window; and
a second station comprises a second aperture larger than the first aperture, a second charged particle filter, and a second window thinner than the first window.

14. The energy dispersive X-ray spectroscopy instrument of claim 13, wherein:
the support structure comprises two embodiments of the first station and two embodiments of the second station.

15. The energy dispersive X-ray spectroscopy instrument of claim 13, wherein:
the second window constructed with a different material from the first window.

16. The energy dispersive X-ray spectroscopy instrument of claim 13, wherein:
the first window is configured with a material that comprises beryllium and the second window is configured with a polymer material.

17. The energy dispersive X-ray spectroscopy instrument of claim 16, wherein:
the polymer material comprises $Si_3N_4$.

18. The energy dispersive X-ray spectroscopy instrument of claim 13, wherein:
the support structure is substantially circular in one plane, wherein the stations are circumferentially arranged on the plane.

19. The energy dispersive X-ray spectroscopy instrument of claim 13, wherein:
the motor comprises a vacuum safe stepper motor.

20. An electron-beam additive manufacturing instrument, comprising:
an electron beam source configured to produce an electron beam;
a platform configured as a support upon which the electron beam additive manufacturing instrument builds a product in response to the electron beam; and
an energy dispersive X-ray spectroscopy instrument that comprises:
a detector configured to produce a signal in response to one or more X-ray photons released from the product in response to the electron beam; and
a shutter assembly configured to protect the detector from emissions released from the product in response to the electron beam, wherein the shutter assembly comprises:
a support structure comprising a plurality of stations and operatively coupled to a motor configured to translate each of the stations to a position in front of the detector, wherein:
a first station comprises a first aperture, a first charged particle filter, and a first window; and
a second station comprises a second aperture larger than the first aperture, a second charged particle filter, and a second window thinner than the first window.

21. The electron-beam additive manufacturing instrument of claim 20, wherein:
the support structure comprises two embodiments of the first station and two embodiments of the second station.

22. The electron-beam additive manufacturing instrument of claim 20, wherein:
the second window constructed with a different material from the first window.

23. The electron-beam additive manufacturing instrument of claim 20, wherein:
the first window is configured with a material that comprises beryllium and the second window is configured with a polymer material.

24. The electron-beam additive manufacturing instrument of claim 23, wherein:
the polymer material comprises $Si_3N_4$.

25. The electron-beam additive manufacturing instrument of claim 20, wherein:
the support structure is substantially circular in one plane, wherein the stations are circumferentially arranged on the plane.

26. The electron-beam additive manufacturing instrument of claim 20, wherein:
the motor comprises a vacuum safe stepper motor.

* * * * *